BINARY SELECTIVE CALLING SYSTEM

Filed Feb. 8, 1961 2 Sheets-Sheet 1

INVENTOR.
Reidar G. Gabrielson
BY Mueller & Aichele
Attys.

Feb. 23, 1965 R. G. GABRIELSON 3,171,098

BINARY SELECTIVE CALLING SYSTEM

Filed Feb. 8, 1961 2 Sheets-Sheet 2

INVENTOR.
Reidar G. Gabrielson
BY Mueller & Aichele
Attys.

United States Patent Office 3,171,098

Patented Feb. 23, 1965

3,171,098
BINARY SELECTIVE CALLING SYSTEM

Reidar G. Gabrielson, Scottsdale, Ariz., assignor to Motorola, Inc., Chicago, Ill., a corporation of Illinois Filed Feb. 8, 1961, Ser. No. 87,872
10 Claims. (Cl. 340—164)

This invention relates generally to electronic selective systems, and more particularly to a selective calling system for use with communications equipment and operated by a calling signal containing binary information in accordance with a call code.

One important application for selective calling systems is in two-way radio communications networks for providing inter-communication between a base station and a number of other stations. The stations may be fixed or they may be provided in vehicles such as automobiles, trucks and aircraft, and each station includes a radio receiver unit and a selective calling unit. The radio receiver unit receives both calling signals and voice signals, and the calling signals are routed to the selective calling unit which provides a suitable output upon reception of a call code identified with the station. The output may operate an alarm device to alert an operator that the station has been called, or the output may condition the radio receiver at the station for reception of a message. Thus, the selective calling units make it possible to call any individual station from the base station.

One very successful type of selective calling system operates with calling signals containing a number of bursts of different frequencies, and these frequency bursts are transmitted in different combinations so as to provide call codes for each of the stations. In some applications there is need for a different type of selective calling system capable of operating with calling signals containing binary information which provides a series of electrical pulses arranged according to a code. The selective calling unit of the receiving station must decode the binary information and produce a suitable output. Although circuits for decoding binary information are known in the art, many of these are too complex and costly, and they are not especially adapted for selective calling functions.

An object of the present invention is to provide a binary selective calling system with simple and straightforward circuits which provide different call codes for identifying the stations of a communications network.

Another object of the invention is to provide a selective calling system with decoding circuits which make it possible to equip economically a relatively small number of stations for selective calling, and which can be expanded to handle a very large number of stations without unduly complicating the circuitry.

A further object of the invention is to provide decoding circuits for a binary selective calling system which decode the binary information directly without requiring intermediate storage and transferring of the information within the system.

A feature of the invention is the provision of a selective system for use with calling signals containing "zero" and "one" binary information in which the "zero" and "one" information is separated and provided in the form of pulses which are supplied to different signal lines, and in which a number of selector circuits are individually connected to the signal lines in a manner which determines a code call identifying a particular station. Each different selective systems in a given network of stations has a different arrangement of connections between the signal lines and the selector circuits, thereby providing different call codes for each station of the network.

Another feature of the invention is the provision of a selective calling system including a number of selector circuits which are energized in succession by a calling signal containing "zero" and "one" binary information in sequence according to a call code identified with the system, and further including an output portion which is operated only if the selector circuits are energized in a complete sequence, and a control circuit which stops the operation before completion of the sequence if the received call code differs from the one identified with the system, thereby providing reliable selective calling.

Another feature of the invention is the provision of a selective calling system in which seqentially operated selector circuits decode a calling signal containing binary information in a manner such that the number of call codes which can be provided and thus the number of stations which can be called individually from a base station, is multiplied greatly as the number of selector circuits provided in the system is increased.

The invention is illustrated in the accompanying drawings in which.

The selective calling system of the invention is operated by calling signals containing "zero" and "one" binary information in sequence according to a call code. The system includes input circuits which receive the calling signals and convert the binary information into "zero" and "one" pulses. A pair of signal lines are provided, and the "zero" pulses are applied to one of the signal lines and the "one" pulses are applied to the other signal line. A number of selector circuits are individually connected to one or the other of the signal lines so that these connections determine a call code which identifies the patricular selective calling system and the station at which it is provided. These connections may be made by switches if desired so that the call code for a particular station may be changed without replacing parts and without rewiring. When the call code identified with the system is received, the selector circuits are energized in a complete sequence to produce an output which may actuate a suitable alarm device such as a light or buzzer, or as an alternative the output many activate the audio circuits of the receiver. If a call code other than one which identifies the system is received, a pulse is applied from one of the signal lines to one of the selector circuits at a time when it is energized, and this selector circuit then actuates a control circuit which stops the sequential operation of the selector circuits. Thus, the selector circuits are energized in a complete sequence producing an output only upon reception of a call code identified with the system.

The overall system will be described first with reference to FIG. 1, and the individual parts of the system will be described more completely with reference to FIGS. 2 and 3.

Figure 1:
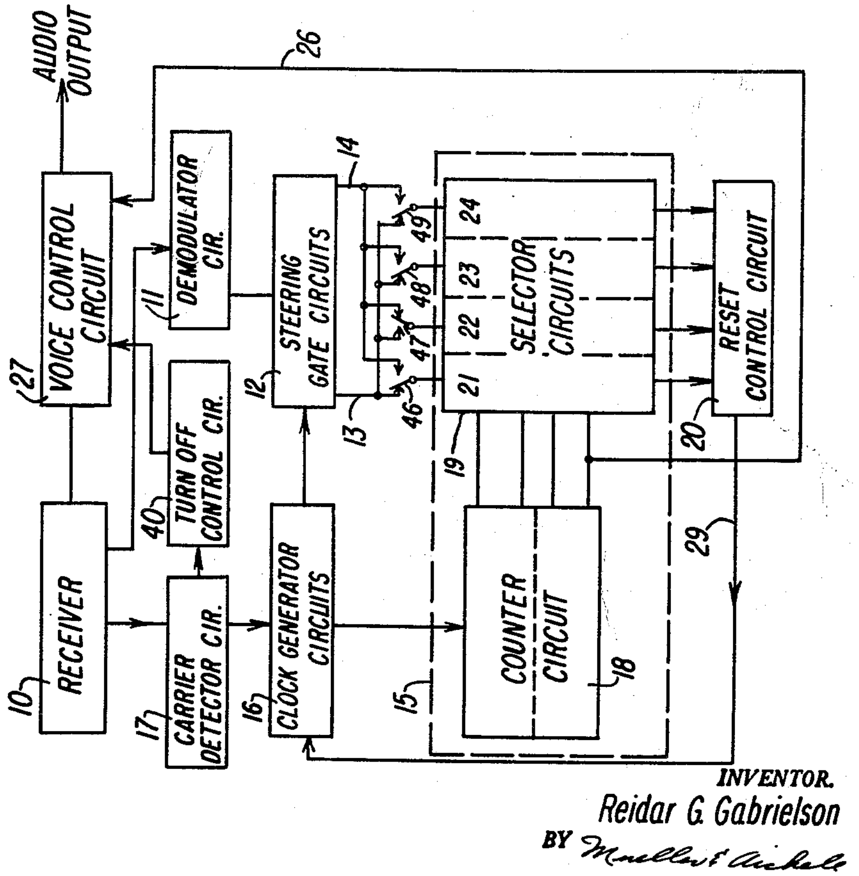
FIG. 1 is a simplified block diagram of a selective calling system for a communications radio receiver in accordance with the invention.

FIG. 1 shows a selective calling system in accodance with the invention for use with a radio receiver 10 of a communications system to provide calling of individual stations from a base station. The radio receiver 10 receives the calling signals which operate the selective calling as well as voice signals or other intelligence. The calling signal contains "zero" and "one" binary information in sequence according to a call code, and this may be transmitted in the form of transitions between different frequencies or phases of a carrier wave. The receiver 10 supplies the voice signals to a voice control circuit 27 which is activated by an output signal supplied to it on line 26 upon reception of a call code identified with the system. The voice control circuit is deactivated at the end of a transmission by a carrier turn-off signal supplied to it from a turn-off control circuit 40.

The receiver 10 supplies the calling signals to a demodulator circuit 11 which converts the frequency or phase transitions of the carrier wave into voltages which control the gate circuits 12 so as to supply pulses to a pair of signal lines 13 and 14 in the sequence of the "zero" and "one" information. The line 13 receives pulses representing the "zero" information, and the line 14 receives pulses representing the "one" information. The pulses supplied to the signal lines 13 and 14 will be referred to as code pulses or code signals because they carry the binary code information.

The code pulses are generated by a clock generator 16 which is activated by suitable synchronizing information provided at the beginning of the calling signal. The synchronization is accomplished by the carrier detector circuit 17 which recognizes the carrier wave of the calling signal as soon as it is received and immediately activates the clock generator 16.

The decoding section of the system indicated by the dashed-line enclosure 15 includes a counter circuit 18 with two stages, and a plurality of selector circuits collectively designated 19 and individually designated 21, 22, 23 and 24. The selector circuits each have an input which is connected to one or the other of the two signal lines 13 and 14 by the switches 46, 47, 48 and 49 in a manner which determines a call code for the system as will be explained later. The selector circuits are also connected to a control circuit 20 which is operative to stop the clock generator circuit 16 upon actuation by one of the selector circuits.

The clock generator 16 supplies sequential pulses to the counter circuit 18, and the counter circuit energizes the selector circuits 21–24 in succession. The energization of the individual selector circuits is timed so that each selector circuit is individually energized during a period when a corresponding code pulse appears on one of the signal lines 13 and 14. If, for example, the first selector circuit 21 is connected to the line 13, and if the first code pulse provided by the calling signal is supplied to the line 13, this pulse will be applied by the selector circuit 21 to the control circuit 20. The control circuit 20 then stops the clock generator circuit 16, and this in turn stops the counter 18 so that the next selector circuit 22 is not energized. Thus, the decoding circuits reject the received calling signal and no output is produced.

On the other hand, if the first code appears on the line 14 and if the selector circuit 21 is connected to line 13 as just described, then the first code pluse will not be applied by selector circuit 21 to the control circuit 20. None of the other selector circuits 22–24 are capable of applying the first code pulse to circuit 20 because they are not energized by the counter 18 at the time the first code pulse appears. Therefore, the sequential operation continues.

Each of the selector circuits 22–24 "sample" the signal line to which they are connected at the time they are energized in the same manner as described in connection with selector circuit 21. If any one of the selector circuits receives a code pulse at the time is is energized, it will apply the code pulse to the control circuit 20 which then stops the decoding operation. If none of the selector circuits receive a code pulse, then the selector circuits 21–24 are energized in a complete sequence and an output is supplied over the line 26 which activates the voice control circuit 27. The circuit 27 is then conditioned to provide the audio output from the receiver 10. Thus, it may be seen that the connections of the selector circuits to the signal lines 13 and 14 determine a call code identifying the system, and with the connections made as in FIG. 1 the call code of the system is 1011.

Figure 3:
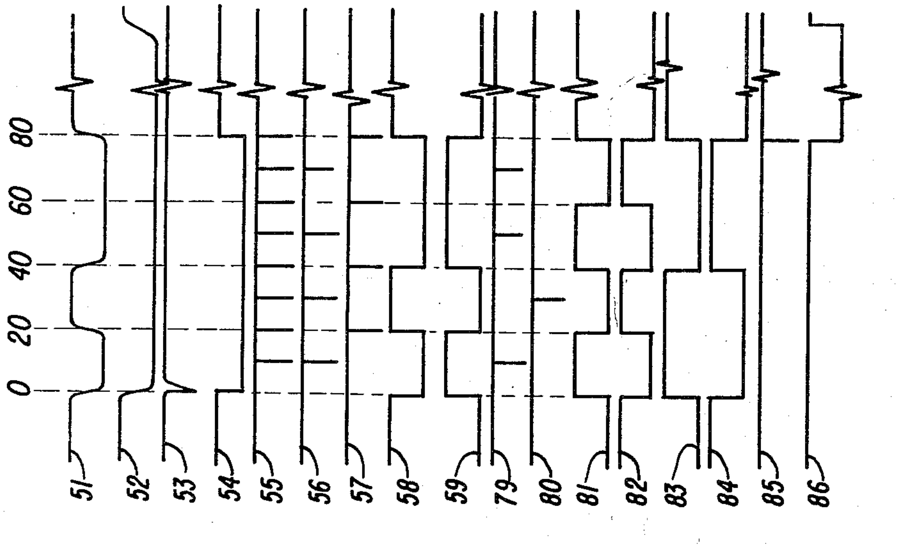
FIG. 3 shows waveforms for various parts of the system illustrated in FIGS. 1 and 2.
Figure 2:
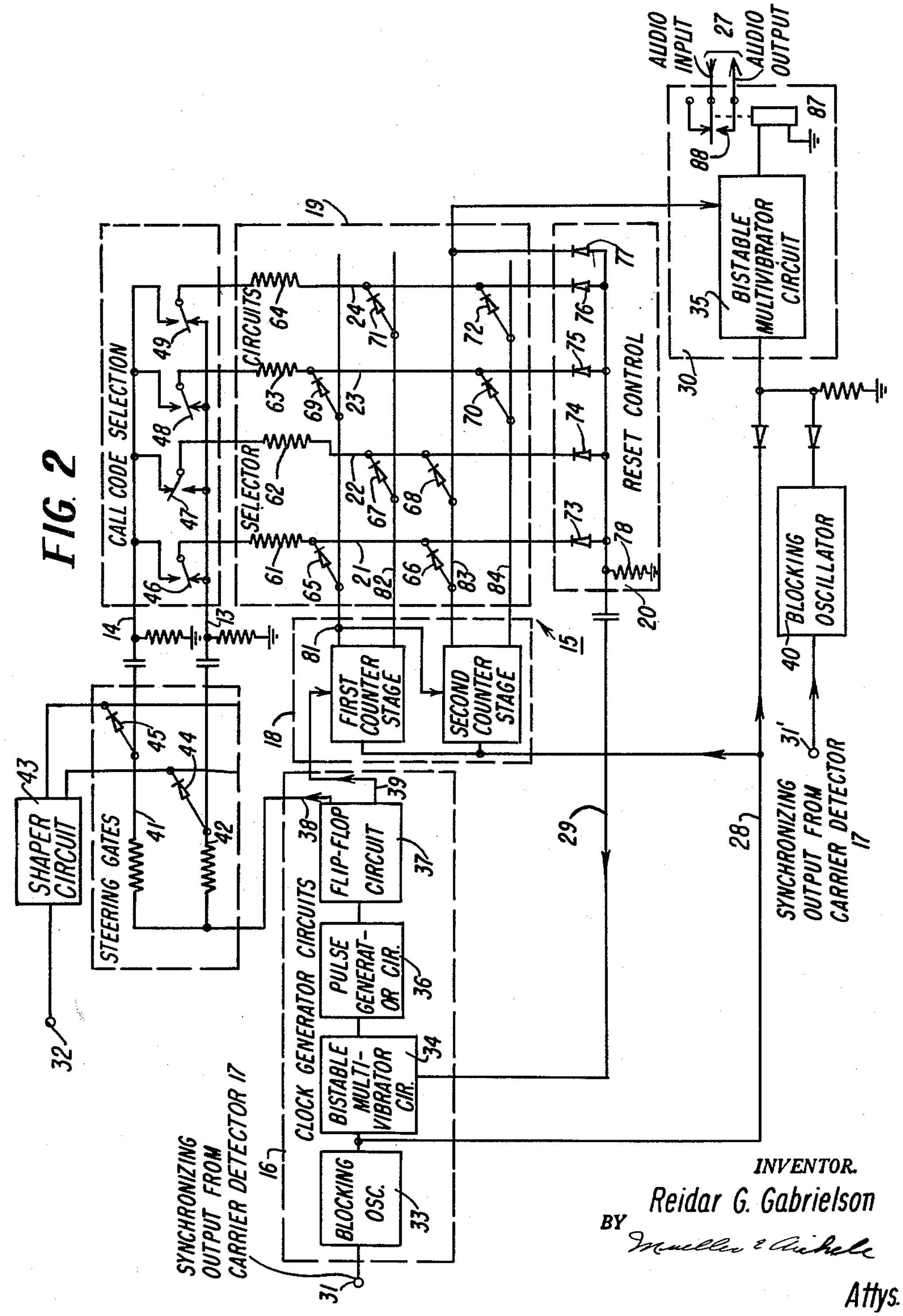
FIG. 2 is a diagram of the selective calling system which shows in particular a number of selector circuits connected to one or the other of a pair of signal lines by switches so as to determine a call code identifying the system.

The construction and functioning of the selective calling system will described further with reference to FIGS. 2 and 3. The illustrated embodiment is adapted for use with a calling signal which contains four bits of information, and as in example each bit of information occupies 20 milliseconds of time. The total calling signal will then occupy 80 milliseconds of time, and this is indicated by the scale in FIG. 3. It should be understood that the calling signal may contain more or fewer bits of information depending upon the number of call codes which are desired for the system. The code capacity of the system is equal to $2^n$ where $n$ is the number of bits of information contained in the calling signal and is also the number of selector circuits provided in the selective calling system. With a four bit calling signal, it is possible to provide $2^4$ or 16 different call codes as shown in the following table.

| Address | Subscriber | Address | Subscriber | Address | Subscriber |
|---|---|---|---|---|---|
| 0001 | 1 | 0110 | 6 | 1011 | 11 |
| 0010 | 2 | 0111 | 7 | 1100 | 12 |
| 0011 | 3 | 1000 | 8 | 1101 | 13 |
| 0100 | 4 | 1001 | 9 | 1110 | 14 |
| 0101 | 5 | 1010 | 10 | 1111 | 15 |
| | | | | 0000 | 16 |

By way of example, the system illustrated in FIG. 2 will be considered to have a call code of 1011, and a calling signal for this call code is represented by the waveform 51 in FIG. 3. The upper voltage level of the waveform 51 is considered as the "zero" level, and the lower voltage level of the waveform is considered as the "one" level for purposes of explanation. The signal 51 is supplied to the input 32 in FIG. 2.

The synchronizing signal is represented by the waveform 52 in FIG. 3, and this signal is supplied from the carrier detector circuit 17 to the terminal 31 and also to terminal 31', illustrated in FIG. 2. The transition from the upper voltage level to the lower voltage level at the beginning of the synchronizing signal actuates a blocking oscillator 33 which produces a spike pulse represented by the waveform 53 in FIG. 3. This spike pulse is applied to a bistable multivibrator circuit 34 causing it to change from an "off" state to an "on" state, and the circuit 34 remains in the "on" state until it is turned off, either at the end of the calling signal or sooner if an improperly coded call is received. The spike pulse is of a finite duration longer than the duration of a transition from the "off" to the "on" condition of the bistable multivibrator circuit to which it is fed. The condition of the bistable multivibrator circuit 34 during the period of the calling signal is represented by the waveform 54 in FIG. 3.

The spike pulse produced by the blocking oscillator circuit 33 is also applied over the line 28 to the counter circuit 18 and also to the output section 30. The spike pulse resets the counter circuit 18 to an initial condition in which it is ready for response to the incoming calling signal. It should be understood that this resetting function may be accomplished at the end of the preceding calling signal if this is desired. The spike pulse also ensures that the bistable multivibrator circuit 35 is set in its proper initial condition.

The transition of the bistable multivibrator circuit 34 at the beginning of the calling signal energizes a pulse generator circuit 36 called a "clock" circuit which produces uniformly timed sequential pulses which are represented by the waveform 55 in FIG. 3. These clock pulses are supplied to a "scale of two" circuit 37 which may be a conventional flip-flop circuit which has two outputs 38 and 39. The circuit 37 supplies sequential pulses to the output 38 which coincide in time with the midpoints of the 20 millisecond bit periods, and the circuit 37 supplies sequential pulses to the output 39 which are delayed 180° or one-half of the bit period with respect to the pulses at the output 38. The pulses supplied to the output 38 are represented by the waveform 56 and those supplied to the output 39 are represented by the waveform 57 in FIG. 3. The pulses 56 are applied to the gate circuits 41 and 42, and the pulses 57 are applied to the counter circuit 18.

The gate circuits 41 and 42 are controlled by the binary input 51 so as to steer the individual clock pulses 56 to one or the other of two signal lines 13 and 14. The binary input is first supplied to a shaper circuit 43 which may be a conventional Schmitt trigger circuit. The circuit 43 applies a control signal illustrated by the waveform 58 to the gate circuit 42 and applies another control signal of opposite polarity represented by the waveform 59 to the gate circuit 41. In the signal 58, the lower or negative voltage level corresponds to the "one" information of the calling signal, and in the waveform 59 the lower or negative voltage level corresponds to the "zero" information of the calling signal.

The diodes 44 and 45 of the steering gate circuits serve to clamp and unclamp the signal lines 13 and 14. The higher voltage levels of the control signals 58 and 59 cause the diodes 44 and 45 to unclamp their respective signal line so as to permit a code pulse to appear on the line. It may be seen from waveforms 58 and 59 that during the first bit period (0 to 20 milliseconds) the diode 45 unclamps the signal line 14 and permits the first clock pulse in the waveform 56 to appear on the signal line 14, whereas the diode 44 clamps the signal line 13 and thus attenuates the first clock pulse. During the second bit period (from 20 to 40 milliseconds) the diode 44 unclamps line 13 and permits the second clock pulse in the waveform 56 to appear on the signal line 13, whereas the diode 45 clamps line 14 and attenuates the second clock pulse. In this manner the two gate circuits 41 and 42 steer the clock pulses 56 so that they are supplied to the signal lines 13 and 14 in the sequence of the binary information of the calling signal.

In the example being described where the call code is considered as 1011, the first clock pulse is supplied to the "one" signal line 14, the second clock pulse is supplied to the "zero" signal line 13, and the third and fourth clock pulses are supplied to the "one" signal line 14. The pulses on the "one" signal line 14 are shown by the waveform 79 in FIG. 3, and the pulses on the "zero" signal line 13 are shown by the waveform 80 in FIG. 3. As previously mentioned, the pulses on the two signal lines are referred to as code pulses because they appear on the signal lines in the sequence of the call code of the incoming calling signal.

The code pulses control the decoding circuit 15 which includes the selector circuits 19 and the counter circuit 18. The number of selector circuits provided in the system is the same as the number of bits of binary information contained in the calling signal, and for the illustrated embodiment this requires four selector circuits 21 to 24. Each of the selector circuits includes a resistor and a pair of diodes, and the resistors are identified by the numerals 61–64 inclusive and the diodes are identified by the numerals 65–72 inclusive. The selector circuits 21–24 are individually connected to a control circuit 20 in the form of an "or" gate which includes five diodes numbered 73–77 inclusive, and a resistor 78. As previously explained, the control circuit 20 is operative to stop the clock circuit 36, thereby stopping the decoding operation, if any of the selector circuits 21–24 apply a code pulse to the control circuit.

The counter circuit 18 is of the frequency divider type and it has four outputs numbered 81 to 84. The diodes 65–72 of the selector circuits are connected to the counter outputs 81–84 in a manner which provides sequential energization of the selector circuits. The condition of the four counter outputs 81–84 during the calling signal is represented by the waveforms 81–84 in FIG. 3. The upper voltage level of the counter outputs 81–84 causes the diodes 65–72 to clamp their respective selector circuits so as to attenuate a code pulse applied thereto, and the lower voltage level of the counter outputs causes the diodes 65–72 to unclamp their respective selector circuits so as to permit it to apply a code pulse to the control circuit 20.

In order for any one of the selector circuits to apply a code pulse to the control circuit 20, the code pulse must be applied to that selector circuit at a time when both of its diodes receive the lower voltage from the counter.

In the illustrated example, the first code pulse appears on line 14 ten milliseconds after the start of the calling signal as shown by the waveform 79, and at this time the two diodes 65 and 66 receive the lower voltage from the counter outputs 81 and 83. Thus, at this time the first selector circuit 21 is unclamped so that it is capable of applying a code pulse to the control circuit 20. However, the first code pulse is on line 14, whereas the selector circuit 21 is connected to line 13 by the switch 46. Thus, the selector circuit 21 does not receive a code pulse, and the sequence of operation continues because the control circuit 20 is not actuated.

The second code pulse appears on line 13 as shown by waveform 80 in FIG. 3, and the second selector circuit 22 is unclamped during the period of the second code pulse because the two diodes 67 and 68 both receive the lower voltage from the counter outputs 82 and 83. Since the selector circuit 22 is connected to the signal line 14, no code pulse is applied to it during the second bit period, and therefore the sequence of operation continues because the control circuit 20 is not actuated.

The third and fourth selector circuits 23 and 24 are respectively unclamped during the third and fourth bit periods by the counter. However, the third and fourth code pulses appear on line 14, whereas the selector circuits 23 and 24 are connected to signal line 13. Thus, none of the code pulses are applied to the reset control circuit 20, and the selector circuits 21–24 are energized in a complete sequence by the counter circuit 18.

At the end of the calling signal a pulse represented by the waveform 85 in FIG. 3 is produced by the control circuit 20, and this pulse is applied over line 29 to the bistable multivibrator circuit 34 which controls the clock circuit and also to the bistable multivibrator circuit 35 which controls the relay 87. The circuit 34 is turned "off" by this pulse and thus deactivates the clock generator circuit 36. The bistable circuit 35 is turned "on" by the output pulse 85 as shown by the waveform 86 in FIG. 3, and this actuates the relay 87 which closes contacts 88 in the voice control circuit 27. This conditions the receiver 10 (FIG. 1) for reception of voice communications.

At the end of the transmission, the carrier signal ceases, and this produces the positive going transition at the end of the synchronizing signal which is represented by waveform 52 in FIG. 3. This transition causes a blocking oscillator 40, which is the turn-off control circuit, to produce a spike pulse similar to that of waveform 53. The latter pulse resets the bistable multivibrator circuit 35 to its initial condition, thus releasing relay 87 to open contacts 88 in the voice control circuit. This completes the operating cycle of the system. The pulse produced by the oscillator 40 may also be applied to the counter circuit 18 to reset it at the end of the transmission if desired.

As may be seen from the foregoing description, the connections of the selector circuits 21–24 to the two signal lines 13 and 14 determine a call code which provides the complete sequence of operation which causes the output section 30 to be actuated. When the selector circuits 21, 23 and 24 are connected to the "zero" signal line 13 and the selector circuit 22 is connected to the "one" signal line 14, the call code identifying the system is 1011 as described above. It will be apparent that the connections of the selector circuits to the signal lines may be changed to provide any of the other call codes listed in the table above. The switches 46–49 make it possible to change the call code for a given selector system without doing any rewiring. In applications where the call code assigned to a particular station is permanent, the switches 46–49 may be omitted and permanent connections between the selector circuits 21–24 and the signal lines 13 and 14 may be made. The code capacity of the system may be increased or decreased in an exponential manner merely by increasing or decreasing a number of selector circuits, the number of counter stages and the number of diodes in the control circuit 20. The rest of the circuitry may be the same as illustrated regardless of the code capacity of the system.

I claim:

1. A selective calling unit for use with calling signals containing "zero" and "one" binary information in sequence according to a call code, said unit including in combination, first and second signal lines, circuit means receiving the calling signals and supplying first code signals representing the "zero" information to said first signal line and supply second code signals representing the "one" information to said second signal line, such that said first and second code signals are distributed between said signal lines in the sequence of the binary information, decoding circuit means including a plurality of selector circuits, each of said selector circuits having an input for receiving code signals, said decoding circuit means having energizing means for energizing said selector circuits in sequence such that the energization of each of said selector circuits coincides in time with successive ones of said code signals, output means coupled to said decoding circuit means and operated thereby only if said selector circuits are energized in a complete sequence, and means individually connecting each of said inputs of said selector circuits to a selected one of said signal lines so that such connections determine a particular distribution of code signals on said first and second signal lines which provides the complete sequence of operation of said selector circuits and thereby determines a particular call code which identifies said selective calling unit.

2. A selective calling system for use with calling signals containing "zero" and "one" binary information in sequence according to a call code, said system including in combination, first and second signal lines, circuit means receiving the calling signals and supplying first code signals representing the "zero" information to said first signal line and supplying second code signals representing the "one" information to said second signal line, such that said first and second code signals are supplied to said signal lines in the sequence of the binary information, decoding circuit means including a plurality of selector circuits, each of said selector circuits having an input for receiving code signals, said decoding circuit means having energizing means sequentially energizing said selector circuits such that the energization of each of said selector circuits coincides in time with sequential ones of said code signals, output means coupled to said decoding circuit means and operated thereby only if said selector circuits are energized in a complete sequence, and switching means individually connecting each of said inputs of said selector circuits to a selected one of said signal lines so that such connections determine a call code providing the complete sequence of operation of said selector circuits to cause operation of said output means, said switching means being capable of connecting said inputs of said selector circuits to either of said first and second signal lines, thereby permitting selection of different call codes for said system.

3. A system for providing selective calling of one of a plurality of stations in response to a calling signal which provides sequential pulse information representing a call code, said system including in combination, input circuit means receiving the calling signals and supplying the sequential pulse information, decoding circuit means including a counter circuit providing a continuous counting cycle in response to said sequential pulse information, and a plurality of selector circuits selectively energized in sequence by said counter circuit, output means coupled to said decoding circuit means and operated thereby only if said counter circuit advances through a complete counting cycle thereby energizing said selector circuits in a complete sequence, and control circuit means coupled to said selector circuits and controlling the operation of said counter circuit, said selector circuits being connected to said counter circuit and to said input circuit means so as to determine a code call identifying said system which provides the complete sequence of operation thereof, and said selector circuits being operative to actuate said control circuit means at any point in such sequence of operation at which the received call code differs from the one identifying said system thereby causing said control circuit means to interrupt the counting cycle of said counter circuit before completion of such counting cycle to prevent operation of said output means responsive to such different call code.

4. A selective calling system for use with calling signals containing "zero" and "one" binary information in sequence according to a call code, said system including in combination, first and second signal lines, circuit means receiving the calling signals and supplying first pulses representing the "zero" information to said first signal line and supplying second pulses representing the "one" information to said second signal line, decoding circuit means including a plurality of selector circuits each having an input for receiving said pulses, said decoding circuit means further including a counter circuit providing a continuous counting cycle and energizing said selector circuits in sequence in response to said pulses, output means coupled to said decoding circuit means and operated thereby only if said counter circuit advances through a complete counting cycle energizing said selector circuits in a complete sequence, means individually connecting each of said inputs of said selector circuits to a selected one of said signal lines so that such connections determine a call code identifying said system which provides the complete sequence of operation of said selector circuits, and control circuit means coupled to said selector circuits and controlling the operation of said counter circuit, said control circuit means being actuated by any one of said selector circuits at any point in the sequence of operation thereof at which the received call code differs from the one identifying said system, thereby interrupting the counting cycle of said counter circuit to prevent operation of said output means responsive to such different call code.

5. A selective calling system for use with calling signals containing "zero" and "one" binary information in sequence according to a call code, said system including in combination, first and second signal lines, input circuit means including a source of clock pulses activated upon reception of a calling signal and means receiving the calling signals and supplying first code pulses representing the "zero" information to said first signal line and supplying second code pulses representing the "one" information to said second signal line, decoding circuit means including a plurality of selector circuits each having an input for receiving code pulses, said decoding circuit means further including a counter circuit actuated by the clock pulses from said input circuit means and providing a counting cycle, said counter circuit being operative to energize said selector circuits in succession such that the energization of each of said selector circuits coincides in time with a corresponding one of said code pulses, output means coupled to said decoding circuit means and operated thereby only if said selector circuits are energized in a complete sequence, means individually connecting each of said inputs of said selector circuits to a selected one of said signal lines so that such connections determine whether one of said first and second code pulses is applied to said selector circuit at the time of energization thereof thereby determining a call code identifying said system, and control circuit means coupled to each of said selector circuits and actuated thereby if one of said selector circuits receives a code pulse from said signal lines at the time of energization thereof, said reset circuit means being coupled to said source of clock pulses so as to deactivate the same upon actuation of said control circuit means by any one of said selector circuits thereby interrupting the counting cycle of said counter circuit before completion of the counting cycle thereof, thus preventing the complete sequence of operation of said selector circuits upon reception of a call code other than the one identified with said system.

6. A selective calling system for use with calling signals containing "zero" and "one" binary information in sequence according to a call code, said system including in combination, first and second signal lines, first and second gate circuits respectively connected to said first and second signal lines, clock circuit means supplying sequential pulses to each of said gate circuits upon reception of a calling signal, circuit means receiving the calling signals and actuating said first and second gate circuits respectively according to the sequence of the "zero" and "one" binary information so that said first gate circuit steers clock pulses to said first signal line during the intervals of the "zero" information and said second gate circuit steers clock pulses to said second signal line during the intervals of the "one" information, decoding circuit means including a plurality of selector circuits each having an input for receiving pulses, said decoding circuit means further including a counter circuit energized by clock pulses and providing a counting cycle, said counter circuit being operative to energize said selector circuit in succession such that the energization of each of said selector circuits coincide in time with a corresponding one of the clock pulses on said first and second signal lines, output means coupled to said decoding circuit means and operated thereby only if said selector circuits are energized in a complete sequence, and means individually connecting each of said inputs of said selector circuits to a selected one of said signal lines so that such connections determine a call code identifying said system, said connections being predetermined such that upon reception of a call code other than the one identifying said system one of said selector circuits receives a pulse from one of said first and second signal lines and none of said selector circuits receives a pulse from said signal lines upon reception of the code call identifying said system, control circuit means coupled to each of said selector circuits and actuated by any one of said selector circuits upon application of a pulse thereto from said signal lines, said control circuit means being coupled to said clock circuit means and causing the same to stop upon actuation of said control circuit means by one of said selector circuits, whereby said selector circuits are energized in a complete sequence causing operation of said output means only upon reception of a call code identified with said system.

7. A selective system for use with calling signals containing "zero" and "one" binary information in sequence according to a call code, said system including in combination, first and second signal lines, circuit means receiving the calling signals and supplying first pulses representative of the "zero" information to said first signal line and supplying second pulses representative of the "one" information to said second signal line, such that said first and second pulses are supplied to corresponding ones of said signal lines in the sequence of the binary information, a plurality of selector circuits having inputs for receiving said pulses, means for individually connecting each of said inputs of said selector circuits to a selected one of said signal lines so that such connections determine a particular sequential distribution of representative pulses supplied to said selector circuits, means for sequentially energizing said selector circuits so that such energization coincides in time with successive ones of said code signals, and output means coupled to said selector circuits and operated thereby only if said selector circuits are energized in a complete sequence to thereby determine a particular call code which identifies the selective calling system.

8. A selective calling system for use with calling signals containing "zero" and "one" binary information in sequence according to a call code, said system including in combination, first and second signal lines, circuit means receiving the calling signals and supplying sequential pulse information in response thereto, means for sequentially distributing said pulses to said first and second signal lines such that pulses in time coincidence with the "zero" information are supplies to one line and pulses in time coincidence with the "one" information are supplied to the other line, decoding circuit means including a plurality of selector circuits, each said selector circuit having an input for receiving said pulses, said decoding circuit means having energizing means for sequentially energizing said selector circuits such that the energization of each of said selector circuit coincides in time with corresponding one of said pulses, means individually connecting each of said inputs of said selector circuits to a selected one of said signal lines so that such connections determine a particular sequential distribution of representative pulses supplied to said selector circuits, and output means coupled to said decoding circuit means and operated thereby only if said selector circuits are energized in a complete sequence to thereby determine a particular call code which identifies the selective calling system.

9. A selective calling system for use with calling signals containing "zero" and "one" binary information in sequence according to a call code, said system including in combination, first and second signal lines, circuit means receiving the calling signals and supplying sequential pulse information in response thereto, means for sequentially distributing said pulses to said first and second signal lines such that pulses in time coincidence with the "zero" information are supplied to one line and pulses in time coincidence with the "one" information are supplies to the other line, decoding circuit means including a plurality of selector circuits, each said selector circuit having an input for receiving said pulses, said decoding circuit means having energization means for sequentially energizing said selector circuits such that the energization of each of said selector circuits coincides in time with successive ones of said pulses, means individually connecting each of said inputs of said selector circuits to a selected one of said signal lines so that such connections determine a particular sequential distribution of representative pulses supplied to said selector circuits, means to stop the sequential energization of said selector circuits if a representative pulse supplied thereto by said individual connecting means is not in time coincidence with a corresponding pulse on said signal line, and output means coupled to said decoding circuit and operated thereby only if said selector circuits are energized in a complete sequence to thereby determine a particular call code which identifies the selective calling system.

10. A system for providing selective calling of one of a plurality of stations in response to a calling signal which provides sequential pulse information representing a call code, said system including in combination, input circuit means receiving the calling signals and supplying the sequential pulse information, decoding circuit means including a counter circuit providing a continuous counting cycle in reponse to said sequential pulse information and a plurality of selector circuits connected to said counter circuit and selectively actuated in sequence thereby, output means coupled to said decoding circuit means and operated thereby only in response to operation of said counter circuit through a complete counting cycle to actuate said selector circuits in a complete sequence, and control circuit means coupled to said selector circuits and controlling the operation of said counter circuit, said selector circuits being connected to said counter circuit and to said input circuit means so as to determine a call code which provides the complete sequence of operation of said selector circuits to identify said one station, and said selector circuits being operative to actuate said control circuit means at any point in such sequence of operation at which the received call code differs from the call code identifying said one station and said control circuit means interrupting the counting cycle of said counter circuit before completion of such counting cycle to prevent operation of said output means in response to such different call code.

References Cited in the file of this patent

UNITED STATES PATENTS

| | | |
|---|---|---|
| 2,498,695 | McWhirter | Feb. 28, 1950 |
| 2,514,889 | McGoffin | July 11, 1950 |
| 2,648,831 | Voom | Aug. 11, 1953 |
| 2,794,969 | Barnhart | June 4, 1957 |
| 3,046,526 | Scantlin | July 24, 1962 |
| 3,064,236 | Coleman | Nov. 13, 1962 |
| 3,080,547 | Cooper | Mar. 5, 1963 |